Oct. 18, 1949.                    S. I. WEISS                    2,485,539
                     MAGNETIC SOUND RECORDER UTILIZING
                          VARYING CATHODE CURRENTS
                             Filed June 6, 1945
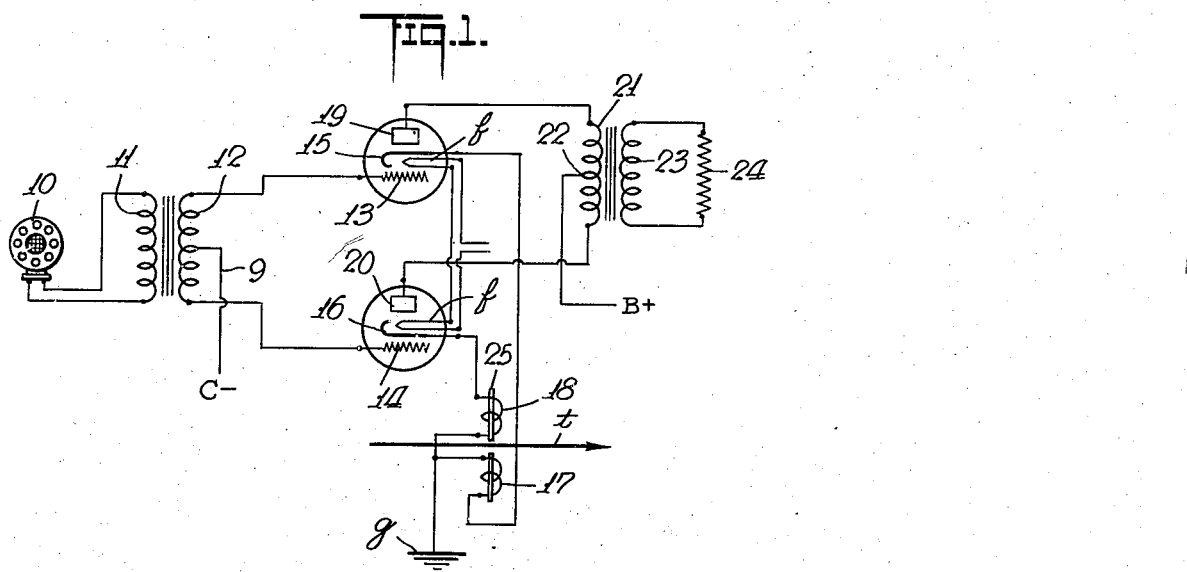
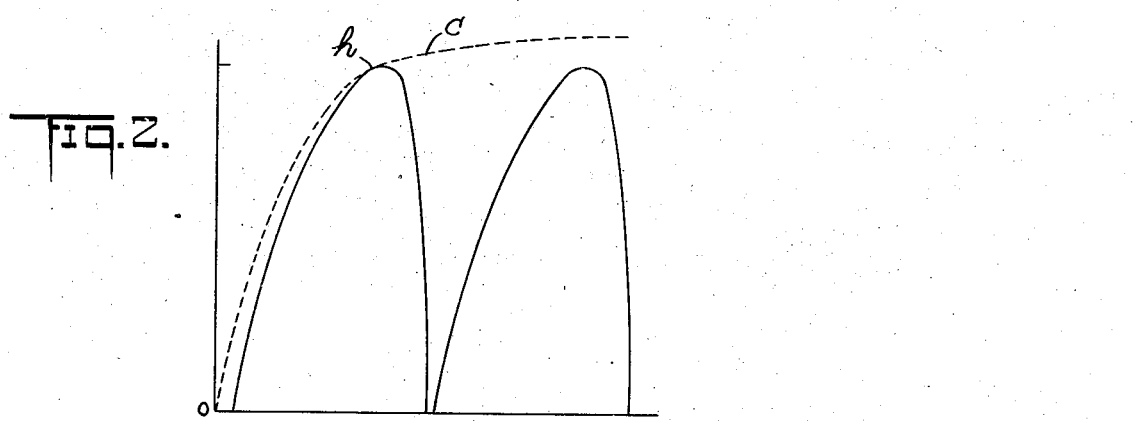
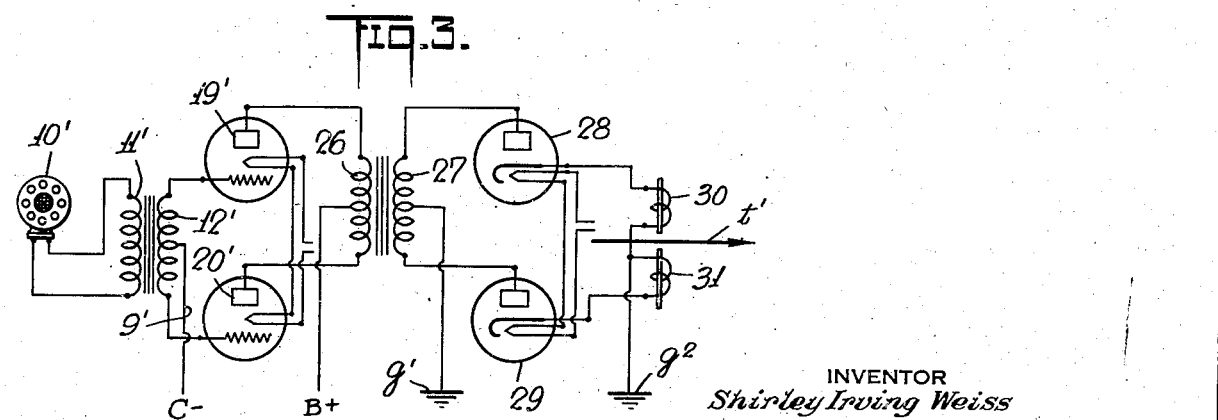
INVENTOR
Shirley Irving Weiss
BY
Dean Fairbank & Hirsch
ATTORNEYS Patented Oct. 18, 1949

2,485,539

UNITED STATES PATENT OFFICE 2,485,539

MAGNETIC SOUND RECORDER UTILIZING VARYING CATHODE CURRENTS

Shirley Irving Weiss, New York, N. Y.

Application June 6, 1945, Serial No. 597,780

3 Claims. (Cl. 179—100.2)

1

The present invention is concerned with electrical methods of magnetic recording.

As conducive to a clear understanding of the invention, it is noted that where the microphone modulated current to be impressed upon the record is superimposed upon a biasing direct current, the small pole pieces of the recorder become more or less saturated due to the presence of the direct current bias; the presence of this direct current in the recording with the A. C. signal results in a non-linear response characteristic of the recording heads (much the same as the presence of D. C. in a low level high quality transformer), for which reason the record suffers considerable distortion that can only be partly obviated by more or less elaborate equalization expedients.

While a supersonic carrier modulated tape recording system mitigates some of these difficulties, the superposition of the sine waves of the carrier and the modulator current frequency causes at times the resultant difference frequency to appear within the audible range. This, of course, can prove to be highly undesirable under certain conditions.

It is among the objects of the present invention to produce accurate recording and correspondingly accurate reproduction with the utilization of the full magnetization value of recording medium such as steel tape, with good performance though the tape be not particularly critical in quality, with the substantial elimination of background noises, with substantially uniform response over a wide range of audio frequencies, eliminating largely the need for equalization.

In the accompanying drawings, in which are shown one or more of various possible embodiments of the several features of the invention, Fig. 1 is a circuit diagram showing a preferred form of recording circuit according to the present invention, Fig. 2 is a diagram indicating the recording of the impulse effected by the present invention, and Fig. 3 is a view similar to Fig. 1 of an alternative form of circuit diagram.

Referring now to Fig. 1 of the drawings, there is shown the microphone 10 connected to the primary 11 of a transformer, the secondary 12 of which is connected at its ends to the grids 13 and 14, respectively, of a push-pull amplifier of the class B type, said grids 13 and 14 being biased in such a manner as to result in zero plate current at no signal input. To effect the desired

2 class B operation, the secondary 12 has a center tap 9 through which bias is applied to the grids 13 and 14 of the tubes from a C battery, indicated at C—. The cathodes 15 and 16 of the respective tubes are heated by the usual filaments $f$ and are connected to the recording coils 17 and 18, respectively, which are in opposition as shown, that is, in push-push relation with respect to the magnetic tape $t$. The unconnected ends of the recording coils are grounded as at $g$.

The plates 19 and 20 of the respective tubes are connected together by the primary 21 of a transformer through the midpoint 22 of which plate current is introduced from a B battery, marked B+.

Since the tubes are operated in a class B condition, the voltage developed in the cathode circuit will be of a varying D. C. character in accordance with signals impressed upon grids 13 and 14. In the push-pull amplifier circuit described, the recording coils 17 and 18 operate alternately, but the pulsations impressed thereby are rectified and always in the same direction, as shown in Fig. 2, and though shown at opposite faces of the tape, they may be at the same face thereof.

The pole pieces 25 are of very soft iron and of light weight. They have high permeability but little retentivity, and so respond sensitively to the pulsations of current through the coils 17, 18.

A resistive load 24 is placed across the secondary 23 of the output transformer, whose primary is shown at 21.

The operation is confined to the effective portion of the magnetization curve C in Fig. 2, that is, to that portion of the curve from the zero line up to the heel $h$ along which part of the curve, the recording response is directly proportional to the magnitude of the impulse, and indeed approximates the alternating current wave from zero to peak. In effect, it is only the pulsating direct current component from the recording or generating circuit that effects recording and this with fairly uniform frequency response and at an extremely low impedance and therefore with a minimum of distortion.

The steel tape records the pulsating positive impulses shown in Fig. 2, delivered to it by the recording heads, with the almost complete cancellation of even harmonic distortion, the latter being substantially cancelled out by the push-pull amplifier. The full magnetization value of the recording medium is made available without any danger of approaching the saturation point and with the need for little or no equalization. The signal strength is moreover practically double that attainable with the use of bias methods of recording, such as those involving a direct or a supersonic frequency alternating carrier current, because the rate of change of a given signal is substantially twice that of such other methods.

In the alternative circuit shown in Fig. 3, the amplifier stage, the general parts of which are similar to those of Fig. 1, and designated by the same reference numerals primed, feeds its entire output into the primary 26 of a transformer, the secondary 27 of which is centrally grounded as at $g'$ and feeds through rectifying tubes 28 and 29 to the respective recording coils 30 and 31, which are grounded at $g^2$ and operate upon the magnetic tape $t'$.

As many changes could be made in the above method and circuit, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. The electrical method of recording audio signals upon a moving magnetic tape utilizing a push pull vacuum tube amplifier which method comprises normally biasing the amplifier to cut off when no audio signal is impressed thereon, alternately varying each of the cathode currents at an audio rate and utilizing such varying cathode currents respectively to create two varying magnetic fields of the same polarity and respectively impressing such varying magnetic fields upon different areas of such tape.

2. An electric circuit for recording audio signals upon a moving magnetic tape, said circuit comprising an input transformer, a microphone connected across the primary of said transformer whereby audio signals may be impressed thereacross, a push pull amplifier having a pair of vacuum tubes each having a plate, a grid and a cathode, the grids of said vacuum tubes being connected respectively to the ends of the secondary of said transformer, the secondary of said input transformer having a center tap means whereby a negative bias is applied through said secondary to the grids of said vacuum tubes normally to retain said tubes at cut off when no audio signal is impressed thereon, a pair of recording coils respectively connected in series with the cathodes of said vacuum tubes and with ground, and a load impedance associated with the plates of said vacuum tubes.

3. The combination set forth in claim 2 in which said load impedance comprises a transformer having a primary connected at each end respectively to one of said plates and a resistor connected across the secondary of said transformer, said primary being center tapped and means whereby a positive potential is applied through said center tap to said plates.

SHIRLEY IRVING WEISS.

REFERENCES CITED

The following references are of record in the file of this patent:

UNITED STATES PATENTS

| Number | Name | Date |
| --- | --- | --- |
| 720,621 | Rosenbaum | Feb. 17, 1903 |
| 1,971,028 | Bothe | Aug. 21, 1934 |
| 2,265,831 | Wooldridge | Dec. 9, 1941 |